July 5, 1932.  O. L. SNYDER  1,865,594
ENGINE
Filed Aug. 8, 1929
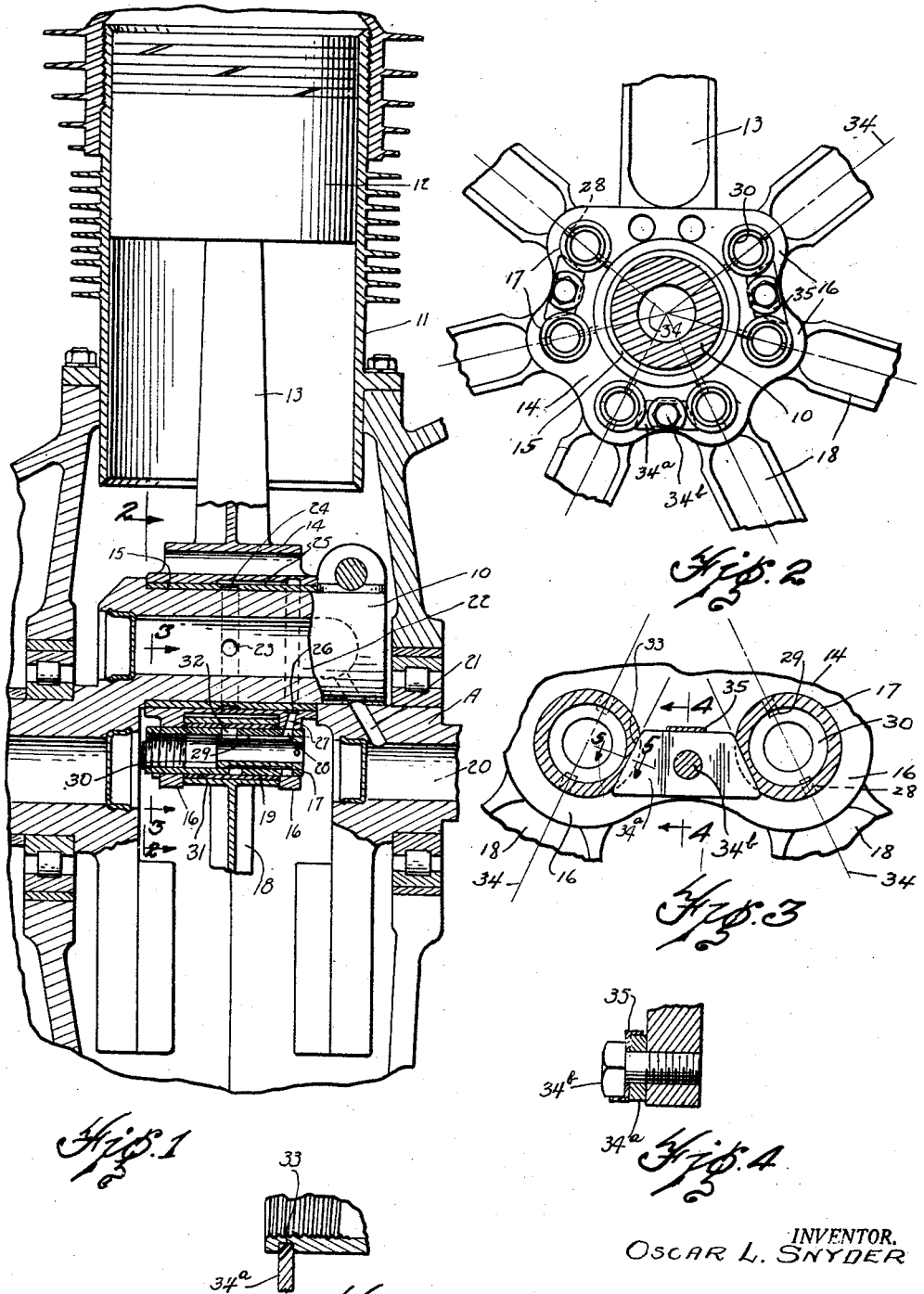
INVENTOR.
OSCAR L. SNYDER
BY W. W. Harris
ATTORNEY.

Patented July 5, 1932

1,865,594

UNITED STATES PATENT OFFICE

OSCAR L. SNYDER, OF MARYSVILLE, MICHIGAN, ASSIGNOR, BY MESNE ASSIGNMENTS, TO CONTINENTAL AIRCRAFT ENGINE COMPANY, A CORPORATION OF DELAWARE

ENGINE

Application filed August 8, 1929. Serial No. 384,431.

This invention relates to internal combustion engines particularly of the radial cylinder type wherein a plurality of connecting rods are articulated from a master rod.

One object of my invention resides in the provision of an improved articulated rod construction capable of being manufactured at relatively low cost. A further object of my invention resides in a novel construction of the character referred to in which the knuckle pins are free from the customary heads which ordinarily prevent machining of the knuckle pins in the well known centerless grinders. I have provided a construction wherein the knuckle pins may be ground efficiently so as to remove the aforesaid objection and also I have provided a novel means for locking the knuckle pins in position.

A still further feature of my invention resides in a knuckle pin assembly in which the pins are interchangeable, this feature being of particular significance in cheapening the manufacture and facilitating servicing of the knuckle pins.

Other objects and advantages of my invention will be apparent from the following illustrative description of one embodiment of my invention.

Referring to the accompanying drawing, Fig. 1 is a sectional elevation view through a cylinder of the engine showing the connecting rod articulating assembly.

Fig. 2 is a detail view along the line 2—2 of Fig. 1, showing the crank and connecting rod assembly, Fig. 3 is a detail view of the locking device for the knuckle pins, and Figs. 4 and 5 are detail views along the lines 4—4 and 5—5 respectively of Fig. 3.

Reference character A represents the crankshaft having crank 10, cylinders 11 having their axes arranged radially about the crankshaft axis. The cylinders each have a piston 12, one of which is shown in Fig. 1 connected to crank 10 through the master rod 13. The master rod has a hub 14 rigid therewith journalled by crank bushing 15, the hub being formed with pairs of circumferentially spaced lugs 16, each pair of lugs having aligned openings receiving a knuckle pin 17. The pins 17 provide pivotal connection for connecting rods 18, bushings 19 being located between the pins and connecting rod ends.

The knuckle pins 17 are cylindrical with their exterior surface free from projections or the like whereby these pins may be accurately and cheaply ground in production on centerless grinders or like well known machines.

Lubricant is supplied under pressure to the pivotal bearing for rod 13 and rods 18 through crank passages 20, 21, 22, thence through opening 23 and around annular bushing channel 24 to hub passage 25 with its communicating annular oil channel 26. Channel 26 supplies oil to each of the knuckle pins 17 by reason of passages 27 in one of the lugs for each of the knuckle pins. Each pin 17 has a passage 28 opening to passage 27 and the oil thence passes along channel 29 provided within the hollow pin by spool insert 30. The oil thence passes to rod bushing 31 by reason of the pin outlet passage 32.

The knuckle pins 17 are each slotted at 33 along the line parallel with the plane 34 containing the axes of the crank 10 and pin 17, the passage 28 and also preferably the passage 27 associated therewith also being in this plane whereby the knuckle pins are interchangeable. Adjacent pins 17 have their slots 33 engaged by a lock plate 34$^a$ which in turn is fastened to the hub 14 by stud 34$^b$ and lock washer 35 associated therewith.

The lock plate 34$^a$ thus locates the knuckle pins fixed in a predetermined angular position, the pins being interchangeable by reason of the parallel relation of the knuckle pin slots 33 and inlet oil or lubricant passages 28. Such construction providing interchangeability of the pins is of great advantage for production and replacement. At the same time the pins 17 have their cylindrical external bearing surfaces free from projections and the like which prevent convenient and low cost machining of the pins.

What I claim as my invention:

1. In an internal combustion engine of the radial cylinder type comprising in combination a crank, a master rod having a hub provided with lubricant ports and surrounding the crank, a plurality of articulating rods pivotally connected to the hub, pins providing said pivotal connections and having external cylindrical bearing surfaces throughout the length thereof, each of said pins provided with a lubricant conducting passage lying respectively in the planes containing the crank and pin axes, said pins each provided with a slot respectively parallel with said passage, and a locking plate secured intermediate each pair of adjacent pins and having portions provided with faces engaging the bottom wall of said slots to respectively locate the lubricant passages with respect to said lubricant ports.

2. In an internal combustion engine of the radial cylinder type comprising in combination a crank, a master rod having a hub provided with lubricant ports and surrounding the crank, a plurality of articulating rods pivotally connected to the hub, pins providing said pivotal connections, and having external cylindrical bearing surfaces throughout the length thereof, each of said pins provided with a lubricant conducting passage lying respectively in the planes containing the crank and pin axes, said pins each provided with a slot respectively parallel with said passage, and a trapezoidal locking element secured intermediate each pair of adjacent pins and having inclined sides engaging said slots to respectively locate the lubricant passages with respect to said lubricant ports.

3. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage in registration with one of said lubricant ports carried by the hub of said master rod, each pin provided with a slot remote from said lubricant conducting passage and extending in a plane having a predetermined angular relation with respect to a longitudinal axial plane through the pin containing the axis of said passage, and locking means supported by said hub externally thereof and adapted for engagement with said slot to locate the lubricant conducting passage with respect to said associated lubricant port.

4. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage in registration with one of said lubricant ports carried by the hub of said master rod, each pin provided with a slot extending parallel with the axis of the lubricant conducting passage and located adjacent the outer end of said pin, and locking means supported on the face of the hub and being in engagement with said slot to locate the lubricant passage with respect to said associated lubricant port.

5. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage adapted for registration with one of said lubricant ports carried by the hub of said master rod, each pin provided with a slot extending parallel with the axis of the lubricant conducting passage and located adjacent the outer end of said pin, and a locking plate supported by said hub and fixed against relative movement therewith, said plate being in engagement with said slot to locate the lubricant passage with respect to said associated lubricant port.

6. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage in registration with one of said lubricant ports carried by the hub of said master rod, each pin provided with a slot having a bottom extending parallel with the axis of the lubricant conducting passage, and a locking plate supported by said hub and fixed against relative movement therewith, said plate having a flattened portion in engagement with the bottom of said slot to locate the lubricant passage with respect to said associated lubricant port.

7. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage adapted for registration with one of said lubricant ports carried by the hub of said master rod, each pin provided with a slot having a bottom extending parallel with the axis of the lubricant conducting passage, and a locking plate supported on the face of the hub and fixed against relative movement therewith, said plate having a flattened portion in engagement with the bottom of said slot to locate the lubricant passage with respect to said associated lubricant port.

8. In an internal combustion engine of the radial cylinder type comprising in combination a crank, a master rod having a hub provided with lubricant ports and surrounding the crank, a plurality of articulating rods pivotally connected to the hub, pins providing said pivotal connections for the articulating rods, said pins each having a lubricant conducting passage lying in a plane containing the crank and pin axes, each pin provided with a slot remotely located with respect to said passage and arranged in parallel relation therewith, and lock means supported externally of said hub and engaging the slots of adjacent pins and constructed to locate the lubricant conducting passage with respect to the lubricant port carried by said hub.

9. In an internal combustion engine of the radial cylinder type comprising in combination a crank, a master rod having a hub provided with lubricant ports and surrounding the crank, a plurality of articulating rods pivotally connected to the hub, pins providing said pivotal connections for the articulating rods, each of said pins having a lubricant passage registering with said lubricant port, lock means supported externally of said hub and remotely located with respect to said lubricant passage for engaging said pins and constructed to locate the lubricant conducting passage with respect to said port, said lock means and pin passages cooperating to permit interchangeability of said pins with all of said rods.

10. In an internal combustion engine of the radial cylinder type comprising in combination a crank, master rod having a hub provided with lubricant ports and surrounding the crank, a plurality of articulating rods pivotally connected to the hub, pins providing said pivotal connections and having external cylindrical bearing surfaces throughout the length thereof, each of said pins provided with a lubricant conducting passage lying respectively in a plane containing the crank and pin axes, each pin provided with a slot remotely located with respct to said passage and arranged in parallel relation with respect to said passage, and a locking means secured to an external face of said hub adjacent to said pins and provided with portions engaging the slots arranged to respectively locate the lubricant passages with respect to said lubricant ports.

11. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage in registration with one of said lubricant ports carried by the hub of said master rod, each pin provided with a slot having a predetermined angular relation with the axis of the lubricant conducting passage and located adjacent the outer end of said pin, and locking means supported on the face of the hub and adapted for engagement with said slot to locate the lubricant passage with respect to said associated lubricant port.

12. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage adapted for registration with one of said lubricant ports carried by the hub of said master rod, each pin provided with a slot having a predetermined angular relation with the axis of the lubricant conducting passage and located adjacent the outer end of said pin, and a locking plate supported by said hub and fixed against relative movement therewith, said plate being in engagement with said slot to locate the lubricant passage with respect to said associated lubricant port.

13. In an internal combustion engine of the radial cylinder type having in combination with a crank, a master rod having a hub provided with lubricant ports and surrounding the crank, a plurality of articulating rods pivotally connected to the hub, pins providing said pivotal connections, said pins each having a lubricant conducting passage in registration with one of said lubricant ports carried by the hub of said master rod, each pin provided with a slot having a bottom having a predetermined angular relation with the axis of the lubricant conducting passage, and a locking plate supported by said hub and fixed against relative movement therewith, said plate having a flattened portion in engagement with the bottom of said slot to locate the lubricant passage with respect to said associated lubricant port.

In testimony whereof I affix my signature.

OSCAR L. SNYDER.